United States Patent [19]

Maier et al.

[11] 4,041,025
[45] Aug. 9, 1977

[54] P-AMINOAZO DISPERSE DYES

[75] Inventors: Karl Maier; Guenter Hansen, both of Ludwigshafen; Wolf-Dieter Kermer, Fussgoenheim, all of Germany

[73] Assignee: BASF Aktiengesellschaft, Germany

[21] Appl. No.: 612,352

[22] Filed: Sept. 11, 1975

[30] Foreign Application Priority Data

Sept. 27, 1974 Germany .............................. 2446213

[51] Int. Cl.$^2$ ...................... C09B 29/08; C09B 29/26; D06P 1/01; D06P 3/54
[52] U.S. Cl. .................................... 260/158; 260/152; 260/154; 260/156; 260/163; 260/207; 260/207.1; 260/207.5; 260/465 D; 260/471 R; 260/472
[58] Field of Search ............... 260/158, 157, 162, 163, 260/152, 207.1, 187, 156

[56] References Cited

U.S. PATENT DOCUMENTS

| | | | |
|---|---|---|---|
| 3,117,118 | 1/1964 | Barker | 260/207.1 |
| 3,337,522 | 8/1967 | Wegmuller | 260/158 |
| 3,642,767 | 2/1972 | Hahn et al. | 260/158 |
| 3,707,533 | 12/1972 | Pohl | 260/207 |
| 3,708,468 | 1/1973 | Hahn | 260/207 |
| 3,709,872 | 1/1973 | Roller | 260/207.1 |

FOREIGN PATENT DOCUMENTS

| | | | |
|---|---|---|---|
| 43-15310 | 6/1968 | Japan | 260/207.1 |
| 43-17304 | 7/1968 | Japan | 260/207.1 |

*Primary Examiner*—Floyd D. Higel
*Attorney, Agent, or Firm*—Keil, Thompson & Shurtleff

[57] ABSTRACT

Disperse dyes of the formula

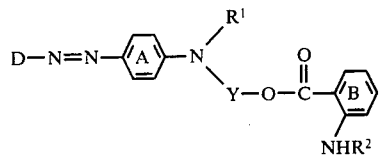

in which
D is the radical of a diazo component, Y is a linear or branched, unsubstituted or substituted alkylene of one to four carbon atoms;
$R^1$ is hydrogen, optionally substituted linear or branched alkyl of one to four carbon atoms, optionally substituted cycloalkyl or aralkyl, phenyl, or a radical of the formula:

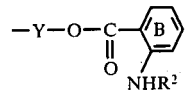

and
$R^2$ is hydrogen or $C_1$ to $C_6$ alkyl which may bear chloro, bromo or cyano as a substituent; and
D and the rings A and B may bear one or more further substituents other than —$SO_3H$ and —COOH;

and also to their productions and their use for dyeing water-repellent fibrous materials. The dyes are eminently suitable for dyeing hydrophobic fibers, particularly polyesters, in yellow to blue-green shades of excellent fastness properties.

9 Claims, No Drawings

P-AMINOAZO DISPERSE DYES

The compounds of formula (I) may be prepared by coupling a diazonium salt of an amine of the formula (II):

with a compound of the formula (III):

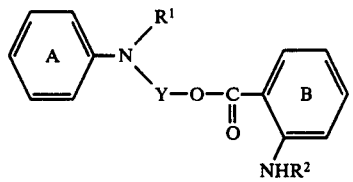

or by acylating a p-aminoazo dye of the formula (IV):

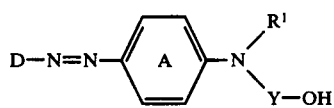

with a compound of the formula (V):

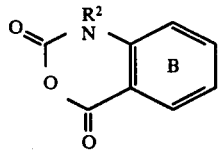

D, Y, $R^1$ and $R^2$ having the above meanings and D and the rings A and B if desired bearing further substituents other than —$SO_3H$ and —COOH.

Examples of radicals D contained in the amines of the formula (II) are: a carbocyclic aromatic radical such as naphthyl, diphenyl, anthraquinonyl and preferably phenyl, an azobenzene radical or a heterocyclic aromatic radical such as thienyl, thiazolyl, isothiazolyl, pyrazolyl, triazolyl, thiadiazolyl, benzothienyl, benzothiazolyl, benzoisothiazolyl, isothiazolopyrimidyl or indazolyl; the radicals D may contain from 0 to 4 substituents.

Examples of substituents for the radical D of the diazo component are:

in the carbocyclic series:

chloro, bromo, nitro, cyano, trifluoromethyl, methylsulfonyl, ethylsulfonyl, phenylsulfonyl, carbomethoxy, carboethoxy, carbobutoxy, carbo-β-methoxyethoxy, optionally N-mono-substituted or N-disubstituted carbamoyl or sulfamoyl, methyl, ethyl, methoxy, ethoxy, phenoxy, thiadiazolyl, oxdiazolyl, benzothiazolyl and benzoxazolyl; examples of the N-substituents of the carboxamides or sulfonamides are methyl, ethyl, propyl, butyl, β-ethylhexyl, cyclohexyl, benzyl, phenylethyl, β-methoxyethyl, γ-methoxypropyl and γ-ethoxypropyl and also the pyrrolidide, piperidide and morpholide; in the azobenzene series:

chloro, bromo, nitro, cyano, carbomethoxy, carboethoxy, methyl, ethyl, methoxy, ethoxy, acetylamino, formyl and ethoxycarbonylamino; in the heterocyclic series:

chloro, bromo, nitro, cyano, thiocyano, methyl, ethyl, phenyl, methoxy, ethoxy, β-cyanoethyl, methylmercapto, butylmercapto, β-carbomethoxyethylmercapto, β-carboethoxyethylmercapto, β-cyanoethylmercapto, carbomethoxy, carboethoxy, acetyl, methylsulfonyl and ethylsulfonyl.

The radical D may be derived for example from the following amines:

aniline, o-toluidine, m-toluidine, p-toluidine, o-nitroaniline, m-nitroaniline, p-nitroaniline, o-cyanoaniline, m-cyanoaniline, p-cyanoaniline, 2,4-dicyanoaniline, o-chloroaniline, m-chloroaniline, p-chloroaniline, 3,4-dichloroaniline, 2,5-dichloroaniline, 2,4,5-trichloroaniline, 2,4,6-trichloroaniline, o-bromoaniline, m-bromoaniline, p-bromoaniline, 2,4,6-tribromoaniline, 2-chloro-4-nitro-aniline, 2-bromo-4-nitroaniline, 2-cyano-4-nitroaniline, 2-methylsulfonyl-4-nitroaniline, 2-methyl-4-nitroaniline, 2-methoxy-4-nitroaniline, 4-chloro-2-nitroaniline, 4-methyl-2-nitroaniline, 4-methoxy-2-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamine or β-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,6-dinitrobenzene-6-carboxylic acid methyl or β-methoxyethyl ester, 3,5-dichloroanthranilic acid propyl ester, 3,5-dibromoanthranilic acid β-methoxyethyl ester, N-benzoyl-p-phenylenediamine, N-acetyl-p-phenylene diamine, N-phenylsulfonyl-p-phenylenediamine, 4-aminoacetophenone, 4-aminobenzophenone, 2-aminobenzophenone, 2-aminodiphenylsulfone, the methyl, ethyl, propyl, butyl, isobutyl, β-ethylhexyl, cyclohexyl, benzyl, phenyl, β-methoxyethyl, β-ethoxyethyl, β-butoxyethyl, methyldiglycol, methyltriglycol, ethyltriglycol, or β-acetoxyethyl ester of 2-aminobenzoic, 3-aminobenzoic or 4-aminobenzoic acid, the methyl, isobutyl, methyldiglycol, β-methoxyethyl, β-butoxyethyl or β-acetoxyethyl ester of 5-nitroanthranilic acid, the dimethyl, diethyl, dipropyl or dibutyl ester of 3-aminophthalic, 4-aminophthalic, 5-aminoisophthalic or aminoterephthalic acid, the amide, methylamide, propylamide, butylamide, isobutylamide, cyclohexylamide, β-ethylhexylamide, γ-methoxypropylamide, γ-ethoxypropylamide or anilide of 3-aminobenzoic or 4-aminobenzoic acid, the dimethylamide, diethylamide, pyrrolidide or morpholide of 2-aminobenzoic, 3-aminobenzoic or 4-aminobenzoic acid, the diamide, or bis-γ-methoxypropylamide of 5-aminoisophthalic acid, the bis-diethylamide of aminoterephthalic acid, the imide, phenylimide or p-tolylimide or 3-aminophthalic or 4-aminophthalic acid, the dimethylamide, diethylamide, pyrrolidide, morpholide or N-methylanilide of 2-aminobenzenesulfonic, 3-aminobenzenesulfonic or 4-aminobenzenesulfonic acid, the ethylimide, butylimide, β-methoxyethylimide, or γ-methoxypropylimide of 4-aminonaphthalic acid, 1-aminonaphthalene, 2-aminonaphthalene, 1-amino-2-ethoxynaphthalene, 4-aminodiphenyl, 1-aminoanthraquinone, 1-amino-4-chloroanthraquinone, 3-aminodiphenylene oxide, 4-aminodiphenylene oxide, 2-aminobenzothiazole, 2-amino-6-methylsulfonylbenzothiazole, 2-amino-6-nitrobenzothiazole, 2-amino-6-methoxybenzothiazole, 2-amino-6-carbomethoxy-benzothiazole, 2-amino-6-thiocyanatobenzothiazole, 5,6-dichloro-2-aminobenzothiazole, 6,7-dichloro-2-aminobenzothiazole, 4-amino-7-nitro-1,2-benzoisothiazole, 4-amino-5-cyano-7-nitro-1,2-benzoisothiazole, 4-amino-5-chloro-7-nitro-1,2-benzoisothiazole, 4-amino-5-bromo-7-nitro-1,2-benzoisothiazole, 3-amino-5-nitro-2,1-benzoisothiazole, 3-amino-5-nitro-7-bromo-2,1-benzoisothiazole, 3-amino-5-chloro-7-nitro-2,1-benzoisothiazole, 3-amino-2,1-benzoisothiazole, 2-aminothiazole, 2-amino-5-nitrothiazole, the ethyl ester of 2-amino-4-methylthiazole-5-carboxylic acid, 2-amino-4-methyl-5-acetylthiazole, the $C_1$- to $C_4$ esters of 2-amino-3-cyano-4-methylthiophene-5-carboxylic acid, 2-amino-3-cyano-4-methyl-5-acetylthiophene, 2-phenyl-5-amino-1,3,4-thiadiazole, 3-methylmercapto-5-amino-1,2,4-thiadiazole, 3-$\beta$-carboethoxyethylmercapto-5-amino- 1,2,4-thiadiazole, 3-$\beta$-carbomethoxyethylmercapto-5-amino-1,2,4-thiadiazole, 3-$\beta$-cyanoethylmercapto-5-amino-1,2,4-thiadiazole, 3-amino-1,2,4-triazole, 4-amino-7-nitrobenzotriazole, 3-aminoindazole, 3-amino-5-chloroindazole, 3-amino-5-nitroindazole, 1-benzyl-5-aminopyrazole, 1-phenyl-5-aminopyrazole, 1-$\beta$-cyanoethyl-5-amino-3,4-trimethylenepyrazole, 6-phenylisothiazolo[5,4-d]pyrimidine, and 6-butylmercaptoisothiazolo[5,4-d]pyrimidine.

Examples of suitable diazo components of the aminoazobenzene series are:

4-aminoazobenzene, 2', 3-dimethyl-4-aminoazobenzene, 3', 2-dimethyl-4-aminoazobenzene, 2,5-dimethyl-4-aminoazobenzene, 2-methyl-5-methoxy-4-aminoazobenzene, 2-methyl-4', 5-dimethoxy-4-aminoazobenzene, 4'-chloro-2-methyl-5-methoxy-4-aminoazobenzene, 4'-nitro-2-methyl-5-methoxy-4-aminoazobenzene, 4'-chloro-2-methyl-4-aminoazobenzene, 4'-formyl-2-methyl-4-aminoazobenzene, 40'-(ethoxycarbonylamino)-2-methyl-4-aminoazobenzene, 2,5-dimethoxy-4-aminoazobenzene, 4'-chloro-2,5-dimethoxy-4-aminoazobenzene, 4'-nitro-2,5-dimethoxy-4-aminoazobenzene, 4'-chloro-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, 1-phenylazo-4-aminonaphthalene and 1-phenylazo-3-ethoxy-4-aminonaphthalene.

Examples of particularly valuable individual diazo components are:

4-nitroaniline, 2-chloro-4-nitroaniline, 2-bromo-4-nitroaniline, 2-cyano-4-nitroaniline, 2-methoxy-4-nitroaniline, 2-aminobenzonitrile, 3-chloro-4-aminobenzonitrile, 2-chloro-5-aminobenzonitrile, 2-amino-5-chlorobenzonitrile, 2,5-dichloro-4-aminobenzonitrile, 1-amino-2,4-dicyanobenzene, 1-amino-2,4-dicyano-6-chlorobenzene, 2-chloro-4-amino-5-nitrobenzonitrile, 2-amino-3-chloro-5-nitrobenzonitrile, 2-amino-3-bromo-5-nitrobenzonitrile, 2,6-dicyano-4-nitroaniline, 2,5-dichloro-4-nitroaniline, 2,6-dichloro-4-nitroaniline, 2,6-dibromo-4-nitroaniline, 2-chloro-6-bromo-4-nitroaniline, 2,4-dinitroaniline, 2,4-dinitro-6-chloroaniline, 2,4-dinitro-6-bromoaniline, 2-amino-3,5-dinitrobenzonitrile, 1-amino-4-nitrobenzene-2-methylsulfone, 1-amino-4-nitrobenzene-2-ethylsulfone, 4-methylsulfonylaniline, 1-amino-2-chlorobenzene-4-methylsulfone, 1-amino-2,6-dibromobenzene-4-methylsulfone, 1-amino-2,6-dichlorobenzene-4-methylsulfone, the methyl or ethyl ester of 2-aminobenzoic, 3-aminobenzoic or 4-aminobenzoic acid, the methyl or ethyl ester of 2-amino-5-nitrobenzoic acid, the methyl or ethyl ester of 2-amino-3-chloro-5-nitrobenzoic acid, the methyl or ethyl ester of 2-amino-3,5-dichlorobenzoic acid, the methyl or ethyl ester of 2-amino-3,5-dibromobenzoic acid, the methyl or $\beta$-methoxyethyl ester of 2-amino-3,5-dinitrobenzoic acid, the diethyl ester of 2-aminoterephthalic acid, 4-aminoazobenzene, 2,3'-dimethyl-4-aminoazobenzene-2', 3-dimethyl-4-aminoazobenzene, 2,5-dimethyl-4-aminoazobenzene, 3,5-dibromo-4-aminoazobenzene, 2-methyl-5-methyl-4-aminoazobenzene, 2-amino-5-nitrothiazole, 3-methylmercapto-5-amino-1,2,4-thiadiazole, 3-$\beta$-carboethoxyethylmercapto-5-amino-1,2,4-thiadiazole, 3-$\beta$-carbomethoxyethylmercapto-5-amino-1,2,4-thiadiazole, 3-$\beta$-cyanoethylmercapto-5-amino-1,2,4-thiadiazole, 2-phenyl-5-amino-1,3,4-thiadiazole, 2-amino-6-methoxybenzothiazole, 3-amino-5-nitro-2,1-benzoisothiazole, 3-amino-5-nitro-7-bromo-2,1-benzoisothiazole, 3-amino-5-chloro-7-nitrobenzoisothiazole, 4-amino-7-nitro-1,2-benzoisothiazole, 4-amino-5-bromo-7-nitro-1,2-benzoisothiazole, and 4-amino-5-cyano-7-nitro-1,2-benzoisothiazole.

The coupling components of the formula (III) may be obtained by the reaction of a compound of the formula (VI):

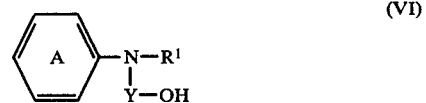

with a compound of the formula (V) in an organic solvent which is devoid of hydroxyl groups, preferably in the presence of a basic catalyst; the radicals Y and $R^1$ have the above meanings and the rings A and B may bear further substituents in addition to —$SO_3H$ and —COOH.

Dyes of the formula (IV), some of which are known, are obtained by conventional methods from diazo components of the formula (II) and coupling components of the formula (VI); they may be acylated in the same way as compounds of the formula (VI).

Compounds of the formula (VI) from which the coupling components of the formula (III) or the azo dyes of the formula (IV) may be prepared are particularly those of the general formula (VII):

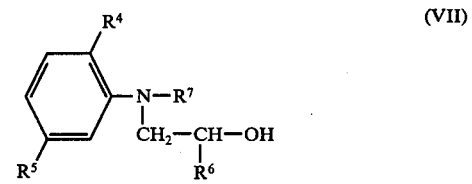

in which
$R^4$ is hydrogen, $C_1$ to $C_4$ alkyl or alkoxy, phenoxy, chloro or bromo;
$R^5$ is hydrogen, $C_1$ to $C_4$ alkyl or alkoxy, phenoxy, chloro, bromo or acylamino;
$R^6$ is hydrogen, methyl, ethyl, hydroxymethyl or chloromethyl and
$R^7$ is optionally substituted, linear or branched $C_1$ to $C_4$ alkyl, cycloalkyl, aralkyl, phenyl or

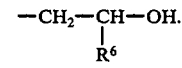

The following radicals are preferred:
for R⁴: hydrogen, chloro, methyl, methoxy and ethoxy;
for R⁵: hydrogen, chloro, methyl, ethoxy and acetylamino;
for R⁶: hydrogen;
for R⁷: hydrogen, methyl, ethyl, propyl, butyl, β-cyanoethyl, β-chloroethyl, β-methoxyethyl, β-acetoxyethyl, β, γ-epoxypropyl, β-carbomethoxyethyl, β-carboethoxyethyl, cyclohexyl, benzyl, phenylethyl, phenyl and a radical of the formula:

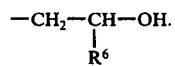

Individual compounds of the formula (VIII) are: N-(β-hydroxyethyl)-aniline, N,N-bis-(β-hydroxyethyl)-aniline, N-(β-hydroxyethyl)-m-toluidine, N-(β-hydroxyethyl)-o-toluidine, N,N-bis(β-hydroxyethyl)-m-toluidine, N,N-bis-(β-hydroxyethyl)-o-toluidine, N-(β-cyanoethyl)-N-(β-hydroxyethyl)-aniline, N-(β-cyanoethyl)-N-(β-hydroxyethyl)-m-toluidine, N-ethyl-N-(β-hydroxyethyl)-aniline, N-ethyl-N-(β-hydroxyethyl)-m-chloroaniline, N-ethyl-N-(β-hydroxyethyl)-m-toluidine, N-methyl-N-(β-hydroxyethyl)-aniline, N-methyl-N-(β-hydroxyethyl)-m-chloroaniline, N-n-butyl-N-(β-hydroxyethyl)-aniline, N-cyclohexyl-N-(β-hydroxyethyl)-aniline, N-benzyl-N-(β-hydroxyethyl)-aniline, N-phenyl-N-(β-hydroxyethyl)-aniline, N-(β-methoxyethyl)-N-(β-hydroxyethyl)-aniline, N-(β-methoxyethyl)-N-(β-hydroxyethyl)-m-toluidine, N-(β-cyanoethoxyethyl)-N-(β-hydroxyethyl)-aniline, 3-acetylamino-N,N-bis-(β-hydroxyethyl)-aniline, 3-acetylamino-N-(β-cyanoethyl)-N-(β-hydroxyethyl)-aniline, 3-acetylamino-5-methoxy-N,N-bis-(β-hydroxyethyl)-aniline, 3-acetylamino-5-methoxy-N-β-cyanoethyl-N-(β-hydroxyethyl)-aniline, N-(β-carbomethoxyethyl-N-(β-hydroxyethyl)-aniline, N-(β-carboethoxyethyl)-N-(β-hydroxyethyl)-aniline, N-(β-carboethoxyethyl)-N-(β-hydroxyethyl)-m-toluidine, N-(β-acetoxyethyl)-N-(β-hydroxyethyl)-aniline, N-(β-acetoxyethyl)-N-(β-hydroxyethyl)-m-toluidine, N-(β-acetoxyethyl)-N-(β-hydroxyethyl)-m-chloroaniline, N-(β-hydroxypropyl)-aniline, N-(β-hydroxypropyl)-m-toluidine, N-(β-hydroxypropyl)-m-chloroaniline, N-(γ-chloro-β-hydroxypropyl)-N-ethylaniline, N-(γ-chloro-β-hydroxypropyl)-N-m-toluidine, N-β-hydroxyethyldiphenylamine, N-β-hydroxybutyl-N-ethylaniline, N-β-hydroxybutyl-N-ethyl-m-toluidine, N-β-hydroxybutyl-N-β-cyanoethylaniline, N-β, γ-dihydroxypropyl-N-ethylaniline, N-β, γ-dihydroxypropyl-N-ethyl-m-toluidine, or N-β, γ-epoxypropyl-N-hydroxyethylaniline.

Examples of compounds of the formula (V) are: isatoic anhydride, 6-chloroisatoic anhydride, 6-bromoisatoic anhydride, 6-nitroisatoic anhydride, 6,8-dichloroisatoic anhydride, 6-chloro-8-nitroisatoic anhydride or 6-bromo-8-nitroisatoic anhydride and also the corresponding compounds bearing methyl, ethyl, propyl, butyl, β-chloroethyl or β-cyanoethyl as substituents on nitrogen which are obtained by alkylation of isatoic anhydride, for example by an alkyl halide, dialkyl sulfate or arylsulfonate by methods which are known in principle.

The following solvents are examples of those which are suitable for the esterification reaction (acylation): hydrocarbons and particularly aromatic hydrocarbons and their derivatives, for example toluene, chlorobenzene and nitrobenzene, halohydrocarbons such as chloroform, dichloroethane, trichloroethane, tetrachloroethane, trichloroethylene or tetrachloroethylene, ethers such as di-n-butyl ether, tetrahydrofuran, dioxane, glycol dimethyl ether or diglycol dimethyl ether, ketones such as acetone or cyclohexanone, carboxylic acids such as formic acid, acetic acid or propionic acid, esters, for example ethyl acetate, dipolar-aprotic solvents such as N,N-dimethylformamide, N,N-dimethylacetamide, N-methylpyrrolidone, hexamethylphosphoric triamide, dimethyl sulfoxide, sulfolane, acetonitrile or nitromethane and mixtures of the said solvents and also amines and preferably tertiary amines such as triethylamine, pyridine, quinoline or N,N-dimethyaniline. When amines are used as solvents they also act as catalysts and the addition of another catalyst is advantageous only in the case of weakly basic amines such as N,N-dimethylaniline.

The reaction temperature is at from 40° to 150° C. In the temperature range of from 70° to 120° C which is preferred industrially the reaction periods are from about half an hour to twenty hours. The temperature is dependent on the solvent and in some cases on the catalyst.

Examples of suitable basic catalysts are alkali metal and alkaline earth metal carbonates and hydrogen carbonates such as sodium carbonate, potassium carbonate, magnesium carbonate, sodium hydrogen carbonate and potassium hydrogen carbonate, salts of carboxylic acids and preferably alkali metal salts of aliphatic carboxylic acids, for example sodium formate, sodium acetate, potassium acetate, sodium propionate, metal hydroxides, for example sodium hydroxide and potassium hydroxide, metal alcoholates, for example sodium methylate, sodium ethylate, potassium ethylate and potassium tert.-butylate and tertiary amines, for example triethylamine and pyridine.

The invention relates particularly to dyes of the formula:

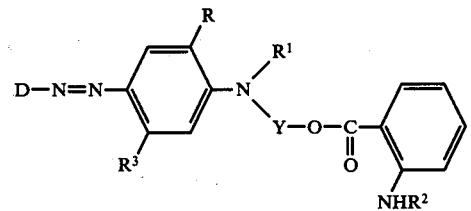

in which
D is phenyl substituted by chloro, bromo, cyano, nitro, methylsulfonyl, ethylsulfonyl, phenylazo, methoxycarbonyl or ethoxycarbonyl; thiadiazolyl substituted by methylmercapto, β-cyanoethylmercapto or β-C₁- to C₄-alkoxycarbonylmercapto; nitrothiazolyl; thienyl substituted by cyano, methyl, acetyl or C₁- to C₄-alkoxycarbonyl; or benzisothiazolyl substituted by chloro, bromo, cyano or nitro; N,N-dimethylaniline.

R is hydrogen, methoxy or ethoxy,

R³ is hydrogen, methyl, chloro, acetylamino or propionylamino,

R¹ is hydrogen, $C_1$- to $C_4$-alkyl, β-cyanoethyl, β-hydroxyethyl or -propyl, β-$C_1$- to $C_4$-alkoxycarbonylethyl, β-$C_1$- to $C_4$-alkoxyethyl or -propyl, cyclohexyl, benzyl, phenylethyl, phenyl or

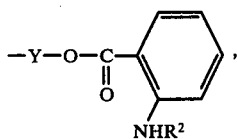

R² is hydrogen, C₁— to C₄-alkyl, β-chloroethyl or β-cyanoethyl and
Y is —CH₂CH₂—,

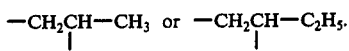

Particular technical importance attaches to dyes of the formula (Ia):

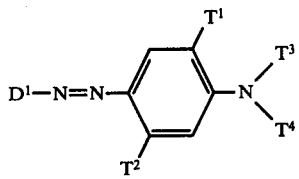

in which
D¹ is phenyl bearing chloro, bromo, cyano, nitro, methylsulfonyl, ethylsulfonyl, phenylazo, carbomethoxy or carboethoxy as a substituent; thiadiazolyl bearing methylmercapto, β-cyanoethylmercapto or a β-C₁ to C₄-alkoxycarbonylethylmercapto as a substituent; nitrothiazolyl; or benzoisothiazolyl bearing chloro, bromo, cyano or nitro as a substituent;
T¹ is hydrogen or methoxy;
T² is hydrogen, chloro, methyl or acetylamino;
T³ is hydrogen, alkyl of one to four carbon atoms, β-cyanoethyl, β-hydroxyethyl, β-hydroxypropyl, β-carbomethoxyethyl, β-carboethoxyethyl, β-methoxyethyl, β-ethoxyethyl, cyclohexyl, benzyl, phenylethyl or T⁴;
T⁴ is

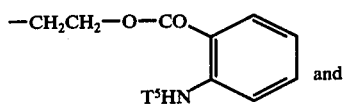

T⁵ is hydrogen, methyl, ethyl, propyl or butyl.
T⁵ is preferably hydrogen.

Dyes of the formula (I) are suitable for dyeing synthetic textile material, particularly of linear polyesters such as polyethylene glycol terephthalate, in the shades from yellow to bluish green, in some cases with very good properties and particularly fastness to light and outstanding fastness to dry-heat pleating and setting. Some of the dyes are also suitable for dyeing mixtures of cellulose and polyesters, for example by the method known as the DYBLN method. The dyes are also valuable in respect of their tintorial properties such as leveling power and build-up.

The following Examples illustrate the invention; references to parts and percentages are by weight unless otherwise stated.

EXAMPLE 1

Production of the coupling component:

a. 16.5 parts of N-ethyl-N-(β-hydroxyethyl)-aniline and 19 parts of isatoic anhydride are boiled in 100 parts of dioxane. 3 parts of potassium carbonate is added in the course of two hours. The whole is allowed to boil under reflux for another five hours. After cooling the salt is filtered off and the solution evaporated.

The yield is 33 parts.

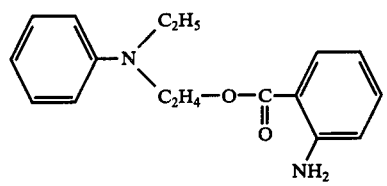

(The content of basic nitrogen, determined by perchloric acid titration in glacial acetic acid, is: found: 8.5% calculated 9.9%)

b. 8.5 parts of N-β-hydroxyethyl-N-ethylaniline, 9- parts of isatoic anhydride and 0.5 part of potassium carbonate are stirred for two hours at 60° C in 20 parts of N,N-dimethylformamide. The solution of the coupling component is filtered at ambient temperature; it may be used immediately for synthesis of dyes.

If the solution is poured into water, extracted with ethylene chloride and concentrated, the coupling component is obtained as an oil. The crystalline dihydrochloride can be isolated from a solution of this oil in ethanol by passing hydrogen chloride in.

The content of basic nitrogen determined by perchloric acid titration in glacial acetic acid is:

found: 8.0% calculated: 7.85%.

and after acetylation with acetic anhydride for one hour at 70° C:

found 4.0% calculated: 3.92%.

The following coupling components are obtained analogously to (a) or (b):

-continued

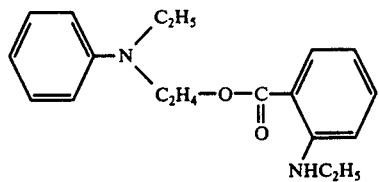

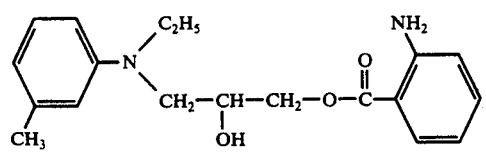

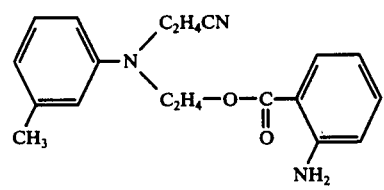

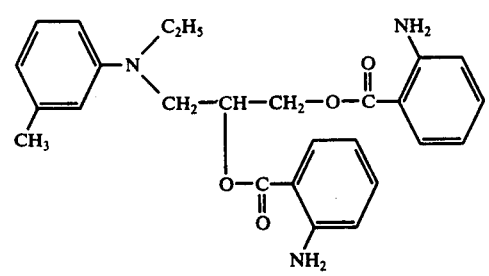

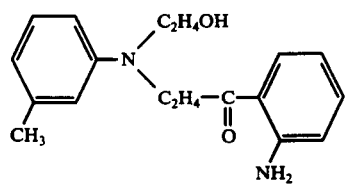

c. Diazotization and coupling 7 parts of p-nitroaniline is dissolved hot in 100 parts of water and 15 parts of 30% hydrochloric acid, added to 150 parts of ice and at from 0° to 5° C a solution of 3.5 parts of sodium nitrite in 6.5 parts of water is added. The whole is stirred for one hour at 5° C, the excess nitrite is destroyed and the diazonium salt solution is filtered into a solution of 18 parts of the coupling component prepared under (a) or a solution of the coupling component prepared under (b) in 12 parts of 30% hydrochloric acid and 150 parts of water. A pH of 4 is set up by adding a solution of sodium acetate and the whole is stirred overnight. The crystalline dye deposited is filtered off, washed free from salt with water and dried in vacuo. 21 parts of the dye of the formula:

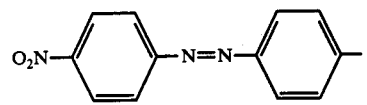

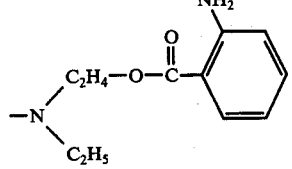

is obtained which dyes polyester fibers red hues having good fastness properties by the HT method or in the presence of carrier substances.

The dyes set out in Table 1 are prepared analogously.

Table 1

| Ex. | Dye | Hue on polyester fibers |
|---|---|---|
| 2 | | scarlet |
| 3 | | reddish violet |
| 4 | | ruby |

Table 1-continued

| Ex. | Dye | Hue on polyester fibers |
|---|---|---|
| 5 | O₂N—⟨⟩—N=N—⟨⟩—N(C₂H₄CN)(C₂H₄—O—CO—⟨⟩—NH₂) | orange |
| 6 | O₂N—(thiazole)—N=N—⟨⟩—N(C₂H₅)(C₂H₄—O—CO—⟨⟩—NH₂) | bluish violet |
| 7 | (nitro-benzothiazole)—N=N—⟨⟩—N(C₂H₅)(C₂H₄—O—CO—⟨⟩—NHC₂H₅) | blue |
| 8 | (nitro-benzothiazole)—N=N—⟨⟩(NHCOCH₃)—N[C₂H₄—O—CO—⟨⟩—NH₂]₂ | blue |
| 8a | O₂N—(benzisothiazole)—N=N—⟨⟩(CH₃)—N(C₂H₅)(CH₂CH(OH)CH₂—O—CO—⟨⟩—NH₂) | violet |
| 8b | O₂N—(benzisothiazole)—N=N—⟨⟩(CH₃)—N(C₂H₅)(CH₂—CH(O—CO—⟨⟩—NH₂)—CH₂—O—CO—⟨⟩—NH₂) | |

EXAMPLE 9

37 parts of the dye of the formula:

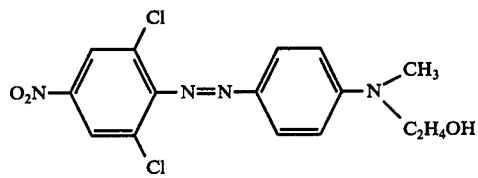

and 19 parts of isatoic anhydride are boiled in 100 parts of dioxane. 3 parts of potassium carbonate is added within two hours and the course of the reaction is monitored by thin layer chromatography. The reaction is completed after boiling for twelve hours. The whole is allowed to cool. The dye is precipitated by adding 40 parts of methanol, suction filtered, washed with a little methanol and a large amount of water and dried in vacuo. 39 parts of the dye of the formula

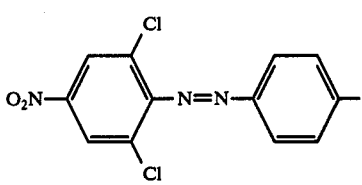

-continued

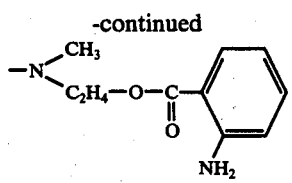

is obtained which dyes polyester fibers a brownish orange hue of good fastness properties and particularly very good fastness to dry-heat pleating and setting.

The reaction may be carried out similarly in other organic solvents; see Table 2.

TABLE 2

The acylation of the dye of the formula:

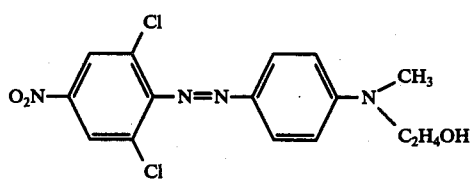

with isatoic anhydride in various solvents:
RP = reaction period in hours;
T = temperature in °C;
DMF = dimethylformamide;

| Solvent | Catalyst | T | RP |
|---|---|---|---|
| 65 parts of chlorobenzene | $K_2CO_3$ | 80-85 | 8 |
| 10 parts of DMF | | | |
| ethylene chloride | " | reflux | 4-6 |
| 1,1,2-trichloroethane | " | 90-95 | 4-6 |
| trichloroethylene | " | 85-90 | 4 |
| tetrachloroethylene | " | 90-95 | 7 |
| DMF | " | 85-90 | 4 |
| tetrahydrofuran | " | reflux | 4 |
| acetone | " | reflux | 6 |
| glacial acetic acid | $NaO_2CCH_3$ | 85-90 | 7 |
| glycol dimethyl ether | $K_2CO_3$ | 85-90 | 3-4 |
| diglycol dimethyl ether | " | 85-90 | 6-7 |
| toluene | " | reflux | 12 |
| ethyl acetate | " | " | 5 |
| acetonitrile | $K_2CO_3$ | reflux | 5 |
| nitromethane | " | 90-95 | 12 |
| cyclohexanone | " | 90-95 | 10 |
| DMSO | " | 90-95 | 1.5 |
| sulfolane | " | 90-95 | 2 |
| triethylamine | " | reflux | 4-5 |
| triethylamine | without | " | 4-5 |
| pyridine | $K_2CO_3$ | 90-95 | 1.5 |
| pyridine | without | 90-95 | 18 |
| N,N-dimethylaniline | $K_2CO_3$ | 90-95 | 11 |
| N,N-dimethylaniline | without | 90-95 | 20 |

EXAMPLE 10

18 parts of the dye of the formula:

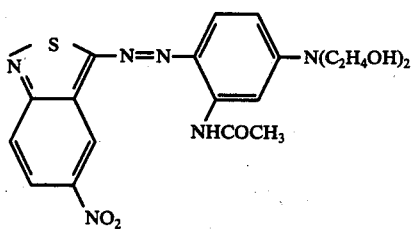

15 parts of isatoic anhydride and 0.5 part of potassium carbonate are boiled in 75 parts of ethylene chloride. The reaction is over after from ten to eleven hours. The whole is allowed to cool, 80 parts of methanol is added, and the precipitated dye is suction filtered, washed with methanol and water and dried in vacuo. 23 parts of the dye of the formula:

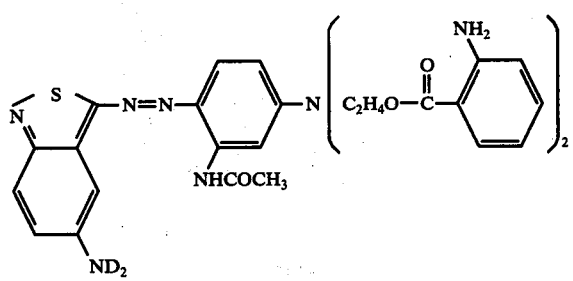

is obtained which dyes polyester fibers blue hues. The dyeings have a high fastness level and particularly good fastness to light and dry-heat pleating and setting.

The reaction can be carried out in the same way in the presence of other catalysts; see Table 3.

TABLE 3

The acylation of the dye of the formula

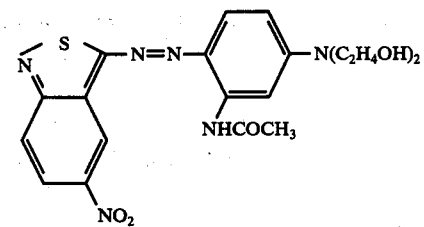

with isatoic anhydride in the presence of various catalyst:

| Catalyst | Reaction period (hours) |
|---|---|
| $Na_2CO_3$ | 10 - 11 |
| $NaHCO_3$ | 20.5 |
| NaOH | 10 - 11 |
| KOH | 10 - 11 |
| $CH_3ONa$ | 10 - 11 |
| triethylamine | 17 |
| pyridine | 10 - 11 |
| without | no reaction |
| $H_2SO_4$ | " |
| $HClO_4$ | " |
| p-toluenesulfonic acid | " |

EXAMPLE 11

14 parts of the dye of the formula:

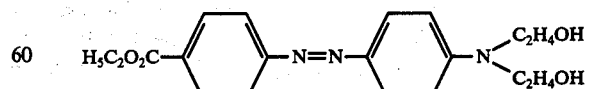

15 parts of isatoic anhydride and 1 part of potassium carbonate are boiled for three hours in 75 parts of ethylene chloride. 250 parts of methanol is added at ambient temperature and the dye is isolated as in Example 10.

19 parts of the dye of the formula

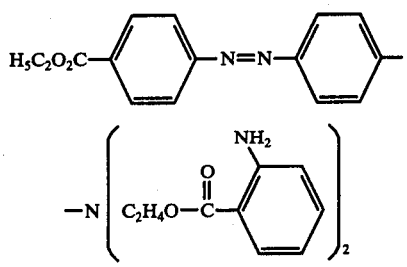

is obtained. It dyes polyester fibers golden yellow hues.

EXAMPLE 12

14 parts of the dye of the formula:

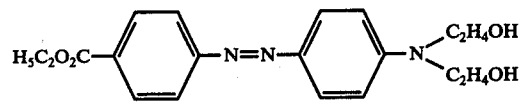

7 parts of isatoic anhydride and 1 part of potassium carbonate are boiled for 2.5 hours in 75 parts of ethylene chloride. 20 parts of methanol is added at 0° C and the dye is isolated as in Example 10. 16 parts of the dye of the formula:

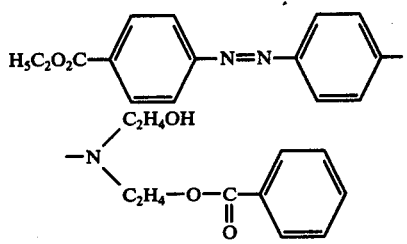

is obtained. It contains small amounts of starting product and doubly esterified product (cf. Example 11) and dyes polyester fibers golden yellow hues.

EXAMPLE 13

28 parts of the dye of the formula

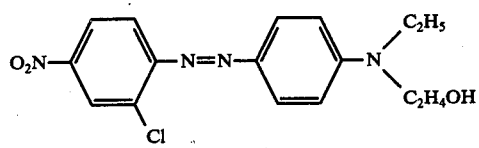

15 parts of isatoic anhydride and 1 part of potassium carbonate are stirred in 170 parts of N,N-dimetnhylformamide at 90° to 95° C for three hours. The whole is diluted with 160 parts of methanol at ambient temperature and the dye is isolated as in Example 10. 26 parts of the dye of the formula

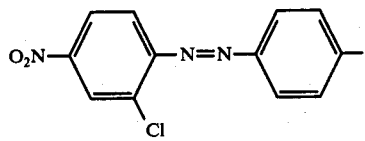

-continued

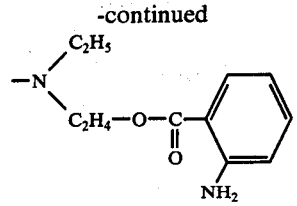

is obtained which gives red dyeings having good fastness properties on polyester fibers.

EXAMPLE 14

21 parts of the dye of the formula:

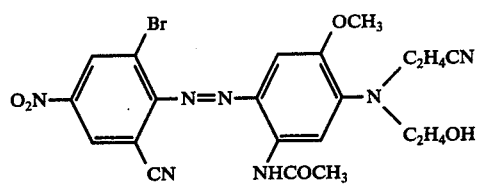

15 parts of isatoic anhydride and 0.5 part of potassium carbonate are boiled in 60 parts of glycol dimethyl ether for nine hours. The whole is diluted with 40 parts of methanol at ambient temperature and the dye is isolated as in Example 10. 20 parts of the dye of the formula:

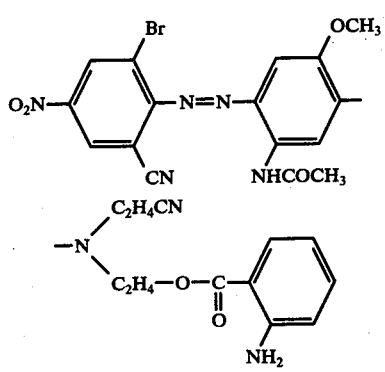

is obtained. It gives blue dyeings on polyester fibers.

EXAMPLE 15

22 parts of the dye of the formula:

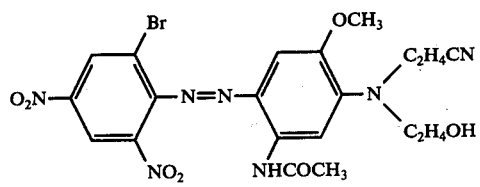

14 parts of 6-chloro-8-nitroisatoic anhydride and 0.5 part of potassium carbonate are boiled for 2.5 hours in 75 parts of ethylene chloride and 15 parts of N,N-dimethylformamide. After 40 parts of methanol has been added the dye is isolated as in Example 10. 26 parts of the dye of the formula:

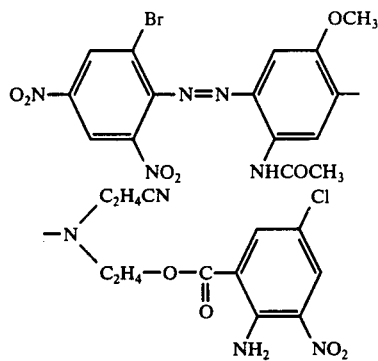

is obtained. It dyes polyester fibers bluish black.

EXAMPLE 16

33 parts of the dye of the formula:

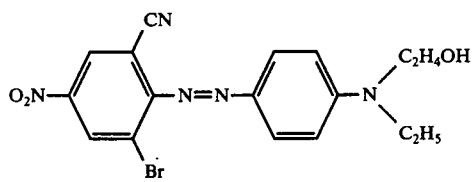

15 parts of isatoic anhydride and 1 part of potassium carbonate is stirred in 100 parts of N,N-dimethylformamdide for 2.5 hours at 80° C. 12.5 parts of copper(I) cyanide (70%) is added at 60° C and the whole is stirred at this temperature for five hours. 80 parts of methanol is added at ambient temperature and the dye is then filtered off, washed with methanol, 10% ammonia solution and water and dried in vacuo. 32 parts of the dye of the formula:

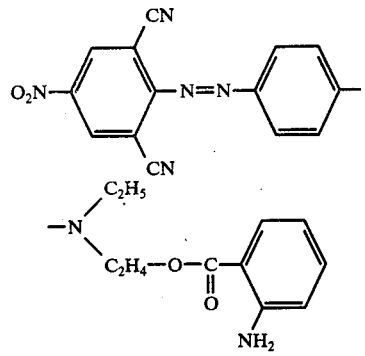

is obtained. It dyes polyester fibers bluish violet hues. The same dye is also obtained when the esterification and exchange reactions are carried out in the reverse sequence or simultaneously or when the corresponding 2,6-dibromo dye is used as starting material.

According to the same methods it is possible to prepare from the dye of the formula:

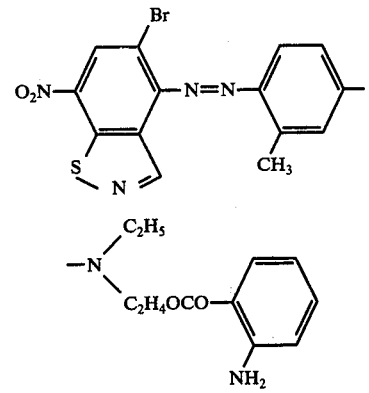

the corresponding cyano compound with which neutral blue dyeings having excellent fastness properties is obtained.

The dyes set out in Tables 4 and 5 are prepared analogously to Examples 9 to 15.

Table 4

| Ex. | D | $R^4$ | $R^5$ | $R^7$ | Hue on polyester |
|---|---|---|---|---|---|
| 17 | $O_2N-\phenyl-$ | H | $CH_3$ | $C_2H_4OH$ | red |
| 18 | " | H | $CH_3$ | $NH_2$, $C_2H_4O_2C-\phenyl$ | " |
| 19 | " | H | $CH_3$ | $C_2H_5$ | " |
| 20 | " | H | H | $C_6H_5$ | scarlet |
| 21 | " | H | H | $C_2H_4COOCH_3$ | " |

Table 4-continued

Structure:

D—N=N—[benzene with R⁴, R⁵]—N(R⁷)—CH₂—CH₂—O—C(=O)—[benzene with NH₂ (ortho)]

| Ex. | D | R⁴ | R⁵ | R⁷ | Hue on polyester |
|---|---|---|---|---|---|
| 22 | " | H | H | CH₂—CH—CH₂ (epoxide, O bridging CH-CH₂) | " |
| 23 | " | CH₃ | H | H | orange |
| 24 | 2,4-dinitrophenyl (O₂N, NO₂ substituents) | H | H | C₂H₄CN | red |
| 25 | 2,4-dinitrophenyl | H | CH₃ | C₂H₄CN | ruby |
| 26 | " | H | H | C₂H₅ | reddish violet |
| 27 | " | H | CH₃ | " | violet |
| 28 | " | H | H | C₂H₄OCH₃ | reddish violet |
| 29 | " | H | H | C₂H₄COOCH₃ | ruby |
| 30 | 3-chloro-4-cyanophenyl (NC, Cl) | H | H | C₄H₉(n) | reddish orange |
| 31 | 2-chloro-4-nitrophenyl (Cl, NO₂) | H | CH₃ | C₂H₄CN | reddish orange |
| 32 | 3-chloro-4-nitrophenyl (O₂N, Cl) | H | H | C₂H₄COOCH₃ | red |
| 33 | " | H | CH₃ | C₂H₅ | reddish violet |
| 34 | " | H | H | C₂H₄CN | scarlet |
| 35 | " | H | CH₃ | " | red |
| 36 | 3-chloro-4-nitrophenyl (O₂N, Cl) | H | H | C₂H₄OCH₃ | red |
| 37 | " | H | H | cyclohexyl (C₆H₁₁) | " |
| 38 | " | H | Cl | CH₃ | " |
| 39 | " | OCH₃ | NHCOCH₃ | C₂H₄OH | violet |
| 40 | " | " | " | C₂H₄O₂C—[benzene with NH₂ (ortho)] | " |
| 41 | " | H | CH₃ | " | ruby |

Table 4-continued

Structure: D—N=N—[benzene with R⁴, R⁵, N(R⁷)(CH₂CH₂—O—C(=O)—[benzene with NH₂])]

| Ex. | D | R⁴ | R⁵ | R⁷ | Hue on polyester |
|---|---|---|---|---|---|
| 42 | 4-O₂N, 2-Br-phenyl | H | H | C₂H₄OCH₃ | red |
| 43 | " | H | H | C₂H₄COOCH₃ | " |
| 44 | " | H | H | C₂H₅ | " |
| 45 | " | H | CH₃ | " | ruby |
| 46 | " | H | H | C₂H₄CN | scarlet |
| 47 | " | H | CH₃ | C₂H₄CN | red |
| 48 | 4-O₂N, 3-Br-phenyl | H | H | C₄H₉(n) | red |
| 49 | " | H | H | C₂H₄O₂CCH₃ | red |
| 50 | 4-O₂N, 2-CN-phenyl | H | H | C₂H₅ | reddish violet |
| 51 | " | H | CH₃ | " | violet |
| 52 | " | H | H | C₂H₄COOCH₃ | ruby |
| 53 | " | H | H | C₂H₄CN | red |
| 54 | " | H | CH₃ | " | ruby |
| 55 | " | H | H | C₂H₄OCH₃ | ruby |
| 56 | " | H | H | C₄H₉(n) | ruby |
| 57 | " | H | H | C₂H₄—phenyl | ruby |
| 58 | " | H | Cl | CH₃ | ruby |
| 59 | 4-O₂N, 2-CO₂CH₃-phenyl | H | CH₃ | C₂H₄CN | red |
| 60 | 4-O₂N, 2-SO₂CH₃-phenyl | H | H | C₂H₅ | ruby |
| 61 | " | H | CH₃ | " | violet |
| 62 | " | H | CH₃ | C₂H₄CN | ruby |
| 63 | " | H | H | " | red |
| 64 | " | H | H | C₂H₄OCH₃ | ruby |
| 65 | " | H | H | C₂H₄COOCH₃ | ruby |
| 66 | " | H | NHCOCH₃ | C₂H₄OH | reddish violet |
| 67 | " | H | " | C₂H₄O₂C—[benzene with NH₂] | " |
| 68 | 4-O₂N, 2,5-diCl-phenyl | H | CH₃ | C₂H₄OH | reddish brown |

Table 4-continued

Structure: D—N=N—[benzene with R⁴, R⁵]—N(R⁷)—CH₂—CH₂—O—C(=O)—[benzene with NH₂]

| Ex. | D | R⁴ | R⁵ | R⁷ | Hue on polyester |
|---|---|---|---|---|---|
| 69 | " | H | CH₃ | 2-aminophenyl-C₂H₄O₂C— | " |
| 70 | 2,6-dibromo-4-nitrophenyl | H | Cl | 2-aminophenyl-C₂H₄O₂C— | reddish brown |
| 71 | " | H | Cl | C₂H₄OH | brown |
| 72 | 2-bromo-6-chloro-4-nitrophenyl | H | Cl | C₂H₄OH | reddish brown |
| 73 | " | H | Cl | 2-aminophenyl-C₂H₄O₂C— | " |
| 74 | 2,4-dinitro-6-chlorophenyl | H | H | C₂H₅ | violet |
| 75 | " | H | CH₃ | " | bluish violet |
| 76 | " | H | H | C₂H₄CN | ruby |
| 77 | " | H | CH₃ | " | violet |
| 78 | " | H | H | C₂H₄OCH₃ | " |
| 79 | " | H | H | C₂H₄COOCH₃ | reddish violet |
| 80 | " | OCH₃ | NHCOCH₃ | C₂H₄CN | blue |
| 81 | 2-nitro-6-chloro-4-nitrophenyl | H | NHCOCH₃ | C₂H₄CN | violet |
| 82 | " | H | " | C₂H₄OH | " |
| 83 | " | H | " | 2-aminophenyl-C₂H₄O₂C— | " |
| 84 | " | H | " | benzyl (C₆H₅—CH₂—) | " |

Table 4-continued

| Ex. | D | R⁴ | R⁵ | R⁷ | Hue on polyester |
|---|---|---|---|---|---|
| 85 | (2-methyl-4,6-dinitro-3-bromophenyl) | H | H | C₂H₅ | " |
| 86 | " | OCH₃ | NHCOCH₃ | C₂H₄CN | navy blue |
| 87 | " | H | " | " | violet |
| 88 | " | H | CH₃ | " | reddish violet |
| 89 | " | H | CH₃ | C₂H₅ | bluish violet |
| 90 | " | H | H | C₂H₄OCH₃ | reddish violet |
| 91 | " | H | H | C₂H₄COOCH₃ | " |
| 92 | (2-methyl-4,6-dinitro-3-bromophenyl) | H | NHCOCH₃ | C₂H₄OH | violet |
| 93 | " | H | " | (2-aminobenzoyloxyethyl) | " |
| 94 | " | H | " | CH₂C₆H₅ | " |
| 95 | (2-methyl-3-cyano-4,6-dinitrophenyl) | H | H | C₂H₄CN | " |
| 96 | " | H | CH₃ | " | bluish violet |
| 97 | " | H | CH₃ | C₂H₅ | blue |
| 98 | (3-bromo-2-methyl-5-nitro-6-cyanophenyl) | H | H | C₂H₅ | violet |
| 99 | " | H | NHCOCH₃ | (2-aminobenzoyloxyethyl) | blue |
| 100 | " | H | " | C₂H₄CN | bluish violet |
| 101 | " | H | CH₃ | " | reddish violet |
| 102 | " | H | CH₃ | C₂H₅ | violet |

Table 4-continued

Structure: D−N=N−[benzene ring with R⁴ and R⁵]−N(R⁷)−CH₂−CH₂−O−C(=O)−[benzene ring with NH₂ (ortho)]

| Ex. | D | $R^4$ | $R^5$ | $R^7$ | Hue on polyester |
|---|---|---|---|---|---|
| 103 | 2-bromo-4-nitro-6-cyanophenyl ($O_2N$−, Br, CN substituted phenyl) | H | $NHCOCH_3$ | $CH_2$−phenyl (benzyl) | bluish violet |
| 104 | 2,4,5-trichlorophenyl | H | H | $C_2H_4CN$ | orange |
| 105 | 2-cyanophenyl | H | Cl | $CH_3$ | " |
| 106 | " | H | Cl | $C_2H_4OH$ | " |
| 107 | " | H | Cl | $C_2H_4O_2C$−(2-aminophenyl) | " |
| 108 | 4-methoxycarbonylphenyl ($COOCH_3$) | H | H | " | golden yellow |
| 109 | " | H | H | $C_2H_4OH$ | " |
| 110 | 3-methoxycarbonylphenyl ($COOCH_3$) | H | H | $C_2H_4CN$ | " |
| 111 | " | H | $CH_3$ | " | " |
| 112 | " | H | H | $C_2H_4OH$ | " |
| 113 | " | H | H | $C_2H_4O_2C$−(2-aminophenyl) | " |
| 114 | 4-(acetoxy)phenyl ($H_3COOC$−) | H | H | $C_2H_4CN$ | golden yellow |
| 115 | " | H | $CH_3$ | " | orange |
| 116 | 2-(ethoxycarbonyl)phenyl ($COOC_2H_5$) | H | H | $C_2H_4OH$ | yellow |
| 117 | " | H | H | $C_2H_4O_2C$−(2-aminophenyl) | " |

Table 4-continued

Structure: D—N=N—[benzene ring with R⁴ (top), R⁵ (bottom)]—N(R⁷)—CH₂—CH₂—O—C(=O)—[benzene ring with NH₂ ortho]

| Ex. | D | $R^4$ | $R^5$ | $R^7$ | Hue on polyester |
|---|---|---|---|---|---|
| 118 | H₅C₂OOC—[m-phenyl]— | H | H | $C_2H_4CN$ | " |
| 119 | " | H | $CH_3$ | " | golden yellow |
| 120 | " | H | H | $C_2H_4OH$ | " |
| 121 | " | H | H | —[phenyl with NH₂ and $C_2H_4O_2C$—] | " |
| 122 | H₅C₂OOC—[p-phenyl]— | H | H | $C_2H_4CN$ | " |
| 123 | " | H | $CH_3$ | " | orange |
| 124 | H₃COOC—[3,5-di-substituted phenyl with H₃COOC]— | H | H | $C_2H_4CN$ | yellow |
| 125 | H₃COOC—[3,5-di-substituted phenyl with H₃COOC]— | H | $CH_3$ | $C_2H_4CN$ | golden yellow |
| 126 | " | H | H | $C_2H_4OH$ | " |
| 127 | " | H | H | —[phenyl with NH₂ and $C_2H_4O_2C$—] | yellow |
| 128 | [2-Cl, 5-COOCH₃ phenyl]— | H | H | $C_2H_4CN$ | golden yellow |
| 129 | " | H | $CH_3$ | " | orange |
| 130 | " | H | H | $C_2H_4OH$ | golden yellow |
| 131 | " | H | H | —[phenyl with NH₂ and $C_2H_4O_2C$—] | " |
| 132 | [thiadiazole: 2-(2-methyl-4-nitrophenyl)-5-methyl-1,3,4-thiadiazolyl] | H | H | $C_2H_5$ | ruby |
| 133 | " | H | H | $C_2H_4OH$ | red |
| 134 | " | H | $NHCOCH_3$ | " | violet |

Table 4-continued

[Structure: D-N=N-[benzene with R4, R5, and N(R7)(CH2-CH2-O-C(=O)-anthranilate)]]

| Ex. | D | R⁴ | R⁵ | R⁷ | Hue on polyester |
|---|---|---|---|---|---|
| 135 | " | H | " | 2-NH₂-phenyl-CO₂C₂H₄- | " |
| 136 | " | H | H | " | red |
| 137 | 2-(5-methyl-1,3,4-thiadiazol-2-yl)-4-nitrophenyl | H | H | C₂H₄CN | red |
| 138 | " | H | H | CH₃ | reddish violet |
| 139 | " | H | CH₃ | C₂H₄OH | " |
| 140 | " | H | CH₃ | 2-NH₂-phenyl-CO₂C₂H₄- | ruby |
| 141 | " | H | Cl | " | red |
| 142 | " | H | Cl | C₂H₄OH | " |
| 143 | " | H | H | C₄H₉(n) | ruby |
| 144 | " | H | CH₃ | C₂H₅ | scarlet |
| 145 | 2-methylthiazol-5-yl | H | H | C₂H₅ | bluish violet |
| 146 | 2-methyl-4-nitrothiazol-5-yl | H | NHCOCH₃ | C₂H₄CN | " |
| 147 | " | H | CH₃ | " | violet |
| 148 | " | H | CH₃ | C₂H₅ | bluish violet |
| 149 | " | H | H | C₆H₅ | violet |
| 150 | 2-methyl-4-nitrothiazol-5-yl | H | H | C₂H₄OCH₃ | bluish violet |
| 151 | " | H | H | C₂H₄CN | reddish violet |
| 152 | " | H | H | C₂H₄OC₂H₄CN | violet |
| 153 | 2-methyl-5-methylthio-1,3,4-thiadiazol-... | H | H | C₂H₄CN | scarlet |
| 154 | " | H | CH₃ | C₂H₅ | red |
| 155 | " | H | CH₃ | C₂H₄CN | " |
| 156 | " | H | H | C₂H₅ | " |
| 157 | " | H | H | C₂H₄OCH₃ | " |
| 158 | " | H | H | benzyl-C₂H₄- | " |
| 159 | 3-(2-cyanoethylthio)-5-methyl-1,2,4-thiadiazol | H | H | C₂H₄CN | scarlet |
| 160 | 3-(2-cyanoethylthio)-5-methyl-1,2,4-thiadiazol | H | CH₃ | C₂H₅ | ruby |
| 161 | " | H | H | C₂H₅ | red |
| 162 | " | H | CH₃ | C₂H₄CN | " |

Table 4-continued

Structure: D—N=N—[benzene with R⁴ ortho to N, R⁵ meta]—N(R⁷)—CH₂—CH₂—O—C(=O)—[benzene-NH₂ (ortho)]

| Ex. | D | R⁴ | R⁵ | R⁷ | Hue on polyester |
|-----|---|----|----|----|------------------|
| 163 | " | H | H | $C_2H_4OH$ | " |
| 164 | " | H | H | (2-aminophenyl)-C(=O)-O-$C_2H_4$- | " |
| 165 | 3-methyl-5-nitro-2,1-benzisothiazol-7-yl | H | NHCOCH₃ | $C_2H_4OH$ | blue |
| 166 | " | H | " | $C_2H_4CN$ | " |
| 167 | " | H | CH₃ | " | bluish violet |
| 168 | " | H | CH₃ | $C_2H_5$ | blue |
| 169 | " | H | H | $C_2H_4OCH_3$ | bluish violet |
| 170 | 5-chloro-7-nitro-2,1-benzisothiazol-3-yl | H | H | $C_2H_5$ | blue |
| 171 | " | H | NHCOCH₃ | $C_2H_4CN$ | " |
| 172 | 7-bromo-3-methyl-5-nitro-2,1-benzisothiazol | H | H | $C_2H_5$ | " |
| 173 | " | H | NHCOCH₃ | $C_2H_4CN$ | " |
| 174 | " | H | CH₃ | " | bluish violet |
| 175 | " | H | CH₃ | $C_2H_5$ | blue |
| 176 | " | H | H | $C_2H_4OCH_3$ | violet |
| 177 | 4-methyl-7-nitro-1,2-benzisothiazol-3-yl | H | H | $C_2H_4COOCH_3$ | " |
| 178 | " | H | H | $C_2H_5$ | " |
| 179 | " | H | CH₃ | $C_2H_4CN$ | " |
| 180 | 5-cyano-4-methyl-7-nitro-1,2-benzisothiazol-3-yl | H | H | $C_2H_4CN$ | bluish violet |

Table 4-continued

Structure: D−N=N−[benzene with R⁴, R⁵]−N(R⁷)−CH₂CH₂−O−C(=O)−[benzene with NH₂ ortho]

| Ex. | D | R⁴ | R⁵ | R⁷ | Hue on polyester |
|---|---|---|---|---|---|
| 181 | 4-methyl-7-nitro-5-cyano-benzisothiazol-3-yl | H | CH₃ | C₂H₅ | blue |
| 182 | 5-bromo-4-methyl-7-nitro-benzisothiazol-3-yl | OCH₃ | NHCOCH₃ | C₂H₄OH | bluish green |
| 183 | " | " | " | 2-(2-aminobenzoyloxy)ethyl (C₂H₄O₂C-C₆H₄-NH₂) | " |
| 184 | " | H | " | " | bluish violet |
| 185 | " | OCH₃ | " | C₂H₄CN | blue |
| 186 | 2-phenyl-1,3,4-thiadiazol-5-yl | H | H | C₂H₄−C₆H₅ | red |
| 187 | " | H | H | C₂H₄O₂CCH₃ | " |
| 188 | 6-methoxy-benzothiazol-2-yl | H | H | C₂H₄OH | " |
| 189 | " | H | H | 2-(2-aminobenzoyloxy)ethyl | " |
| 190 | 6-methylsulfonyloxy-benzothiazol-2-yl (H₃CO₂S-) | H | CH₃ | C₂H₄CN | " |
| 191 | 6-methoxycarbonyl-benzothiazol-2-yl (H₃CO₂C-) | H | H | C₂H₅ | red |
| 192 | 1-(2-cyanoethyl)-4,5,6,7-tetrahydroindazol-3-yl | H | CH₃ | C₂H₄CN | golden yellow |

Table 4-continued
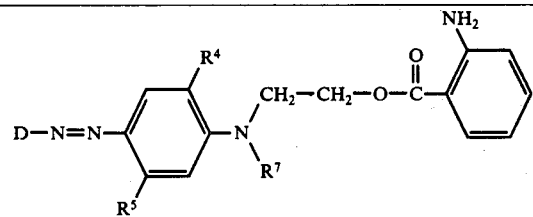
| Ex. | D | R⁴ | R⁵ | R⁷ | Hue on polyester |
|---|---|---|---|---|---|
| 193 | ![indazole with NO2] | H | H | C₂H₅ | orange |
| 194 | ![thiophene structure with CN, H3C, H3C-C(=O)] | H | NHCOCH₃ | C₂H₄CN | violet |
Table 5
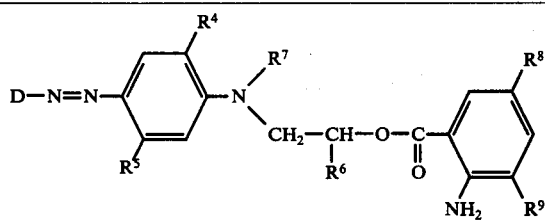
| Ex. | D | R⁴ | R⁵ | R⁶ | R⁷ | R⁸ | R⁹ | Hue on polyester |
|---|---|---|---|---|---|---|---|---|
| 195 | O₂N–⌬– | H | CH₃ | CH₃ | H | H | H | scarlet |
| 196 | " | H | CH₃ | H | ![NH2, C2H4O2C phenyl] | Cl | H | " |
| 197 | " | H | CH₃ | H | ![H2N, Cl, C2H4O2C, Cl phenyl] | Cl | Cl | " |
| 198 | " | H | CH₃ | H | ![NH2, C2H4O2C, NO2 phenyl] | NO₂ | H | " |
| 199 | " | H | CH₃ | H | ![H2N, NO2, C2H4O2C, Cl phenyl] | Cl | NO₂ | " |

Table 5-continued

[Structure: D—N=N—(benzene with R⁴, R⁵)—N(R⁷)—CH₂—CH(R⁶)—O—C(=O)—(benzene with R⁸, NH₂, R⁹)]

| Ex. | D | R⁴ | R⁵ | R⁶ | R⁷ | R⁸ | R⁹ | Hue on polyester |
|---|---|---|---|---|---|---|---|---|
| 200 | 3-Br-2-methyl-4,6-dinitrophenyl (O₂N–, NO₂, Br) | OCH₃ | NHCOCH₃ | H | C₂H₄CN | Cl | H | blue |
| 201 | " | " | " | H | " | Br | H | " |
| 202 | " | " | " | H | " | NO₂ | H | " |
| 203 | " | " | " | H | " | Cl | Cl | navy blue |
| 204 | " | " | " | H | " | Br | NO₂ | " |
| 205 | " | " | H | H | CH₂Cl | C₂H₅ | H | H | ruby |
| 206 | " | H | CH₃ | CH₂Cl | " | H | H | violet |
| 207 | 3-Cl-2-methyl-4,6-dinitrophenyl | H | H | CH₂Cl | " | H | H | ruby |
| 208 | " | H | CH₃ | CH₂Cl | " | H | H | violet |
| 209 | 3-Br-6-CN-2-methyl-4-nitrophenyl | H | H | CH₂Cl | " | H | H | ruby |
| 210 | " | H | CH₃ | CH₂Cl | " | H | H | violet |
| 211 | 3,6-dichloro-2-methyl-4-nitrophenyl | H | H | H | CH₃ | Cl | H | brown |
| 212 | " | H | H | H | CH₃ | Br | H | reddish brown |
| 213 | 3,6-dichloro-2-methyl-4-nitrophenyl | H | H | H | CH₃ | Cl | NO₂ | brown |
| 214 | " | H | H | H | CH₃ | Br | NO₂ | " |
| 215 | " | H | H | H | CH₃ | Cl | Cl | " |
| 216 | " | H | CH₃ | H | C₂H₅OH | NO₂ | H | " |
| 217 | " | H | CH₃ | H | " | Cl | Cl | reddish brown |
| 218 | " | H | CH₃ | H | [3-amino-4-chloro-phenyl with C₂H₄O₂C substituent] | Cl | H | " |
| 219 | " | H | CH₃ | H | [2-amino-3,6-dichloro-phenyl with C₂H₄O₂C substituent] | Cl | Cl | brown |

Table 5-continued
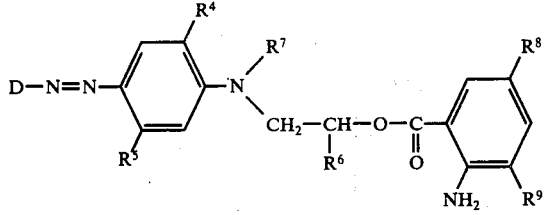
| Ex. | D | R⁴ | R⁵ | R⁶ | R⁷ | R⁸ | R⁹ | Hue on polyester |
|---|---|---|---|---|---|---|---|---|
| 220 | 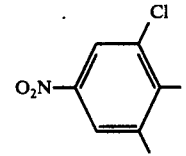 | H | CH₃ | H | 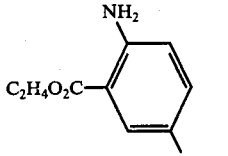 | NO₂ | H | brown |
| 221 | 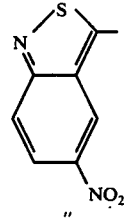 | H | NHCOCH₃ | H | C₂H₄OH | Cl | Cl | blue |
| 222 | " | H | " | H |  | Cl | Cl | " |
| 223 | " | H | " | H | 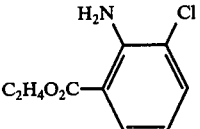 | Cl | H | " |
| 224 | 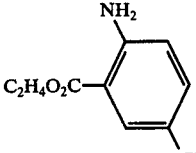 | H | H | CH₃ | C₂H₅ | H | H | violet |
| 225 | 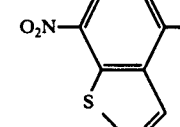 | H | CH₃ | CH₃ | C₂H₄CN | H | H | red |
| 226 | " | H | H | CH₃ | C₂H₄OCH₃ | H | H | " |
| 227 | " | H | NHCOCH₃ | CH₃ | C₂H₄CN | H | H | bluish violet |
| 228 | 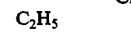 | H | CH₃ | CH₃ | C₂H₅ | H | H | " |
| 229 | " | H | CH₃ | C₂H₅ | C₂H₅ | H | H | " |
| 230 | 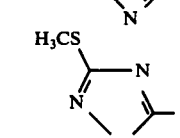 | H | H | H | H | H | H | red |
| 231 |  | H | H | H |  | H | H | " |

EXAMPLE 232 a. Production of the N-methylisatoic anhydride:
81.5 parts of isatoic anhydride are dissolved in
500 parts of N,N-dimethylformamide and
212 parts of anhydrous sodium carbonate is added.
The at 10° C while cooling
126 parts of dimethyl sulfate is dripped in. The whole is stirred for three hours at 10° C, fifteen minutes at from 50° to 60° C and then cooled again. The suspension is stirred slowly into a solution of
280 parts of concentrated hydrochloric acid in
2000 parts of water. The product deposited is immediately isolated, washed until neutral with
1000 parts of water and dried at subatmospheric pressure.
75 parts of N-methylisatoic anhydride is obtained.

The following N-alkylisatoic anhydrides are obtained analogously to (a):

| alkylating agent | N-alkylisatoic anhydride |
|---|---|
| diethyl sulfate | N-ethylisatoic |
| propyl iodide | N-propylisatoic |
| butyl iodide | N-butylisatoic |
| hexyl iodide | N-hexylisatoic |
| p-toluenesulfonic-β-chloroethyl ester | N-β-chloroethylisatoic |
| p-toluenesulfonic-β-cyanoethyl ester | N-β-cyanoethylisatoic | b. Acylation:
64 parts of the dye of the formula

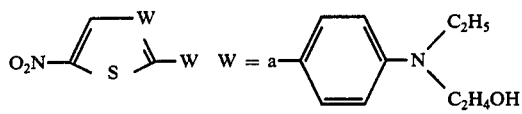

40.5 parts of N-methylisatoic anhydride and 2 parts of potassium carbonate are stirred in 300 parts of ethylene chloride for 2.5 hours after refluxing temperature. Then 500 parts of methanol is added at 30° C. The whole is stirred for ten hours at 0° C. The precipitate is filtered off, washed with water and dried in vacuo at 50° C.

60 parts of a dye of the formula:

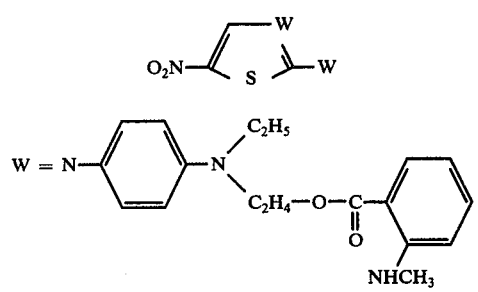

is obtained which dyes polyester fibers bluish violet hues having a high level of fastness.

The two steps (a) and (b) of the process may also be carried out in the same vessel.

The dyes set out in Table 6 are also obtained analogously to Example 232:

Table 6

$$D-N=N-\underset{R^5}{\underset{|}{\bigcirc}}-N\underset{CH_2CH-O-\underset{O}{\overset{||}{C}}-\underset{NHR^2}{\bigcirc}}{\overset{R^7}{|}}$$

| Example | D | $R^2$ | $R^5$ | $R^6$ | $R^7$ | Hue on polyester |
|---|---|---|---|---|---|---|
| 233 | O$_2$N—⌬—CN | CH$_3$ | H | H | C$_2$H$_4$CN | red |
| 234 | " | C$_2$H$_4$CN | H | H | " | " |
| 235 | " | C$_3$H$_7$ | H | H | " | " |
| 236 | " | C$_4$H$_9$ | H | H | C$_2$H$_4$OCH$_3$ | ruby |
| 237 | O$_2$N—⌬— | C$_2$H$_5$ | H | H | C$_2$H$_4$CN | orange |
| 238 | " | C$_2$H$_4$Cl | H | H | " | " |
| 239 | O$_2$N—⌬—Br | CH$_3$ | H | H | C$_2$H$_4$OCH$_3$ | red |
| 240 | H$_3$CS—⟨thiazole⟩— | C$_2$H$_5$ | CH$_3$ | H | C$_2$H$_4$CN | " |

Table 6-continued

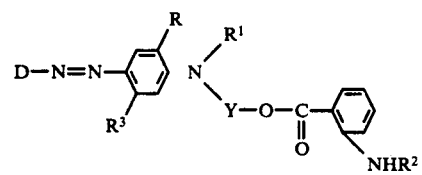

| Example | D | $R^2$ | $R^5$ | $R^6$ | $R^7$ | Hue on polyester |
|---|---|---|---|---|---|---|
| 241 | $NCC_2H_4S$-[thiadiazolyl] | $CH_3$ | $CH_3$ | H | $C_2H_5$ | ruby |
| 242 | " | $C_4H_9$ | H | $CH_3$ | $C_2H_4CN$ | red |
| 243 | " | $C_2H_5$ | H | H | $C_2H_4CN$ | violet |
| 244 | $O_2N$-[benzisothiazolyl] | $CH_3$ | H | H | $C_2H_4OCH_3$ | " |
| 245 | " | $CH_3$ | H | H | $C_2H_4COOCH_3$ | red |
| 246 | $O_2N$-[SO$_2$CH$_3$-phenyl] | $C_2H_5$ | $CH_3$ | $CH_3$ | $C_2H_4CN$ | Bordeaux |
| 247 | $O_2N$-[CN,Br-phenyl] | $C_2H$ | H | H | $C_2H_5$ | blue |
| 248 | [benzisothiazolyl-NO$_2$] | $CH_3$ | $CH_3$ | H | $C_2H_5$ | " |
| 249 | " | $CH_3$ | $CH_3$ | H | $C_2H_4CN$ | " |
| 250 | " | $CH_3$ | $NACCCH_3$ | H | $C_2H_4CN$ | " |
| 251 | " | $C_4H_9$ | " | H | " | " |

We claim:
1. A compound of the formula

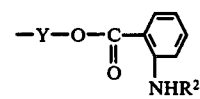

in which
D is thiadiazolyl substituted by methylmercapto, β-cyanoethylmercapto or β-$C_1$- to $C_4$-alkoxycarbonylmercapto; nitrothiazolyl; thienyl substituted by cyano, methyl, acetyl or $C_1$- to $C_4$-alkoxycarbonyl; or benzisothiazolyl substituted by chloro, bromo, cyano or nitro;
R is hydrogen, methoxy or ethoxy,
$R^3$ is hydrogen, methyl, chloro, acetylamino or propionylamino,
$R^1$ is hydrogen, $C_1$- to $C_4$-alkyl, β-cyanoethyl, β-hydroxyethyl or -propyl, β-$C_1$- to $C_4$-alkoxycarbonylethyl, β-$C_1$- to $C_4$-alkoxyethyl or -propyl, cyclohexyl, benzyl, phenylethyl, phenyl or $$-Y-O-\underset{O}{\overset{\|}{C}}-\text{C}_6\text{H}_4\text{-}NHR^2$$

$R^2$ is hydrogen, $C_1$- to $C_4$-alkyl, β-chloroethyl or β-cyanoethyl and Y is —$CH_2CH_2$—, —$CH_2CH$—$CH_3$ or —$CH_2CH$-$C_2H_5$.

2. A compound according to the formula in claim 1, wherein R is hydrogen.

3. A compound according to the formula in claim 1, wherein $R^2$ is hydrogen.

4. A compound according to the formula in claim 1, wherein $R^3$ is hydrogen, methyl or acetylamino.

5. A compound according to the formula in claim 1, wherein Y is —$CH_2CH_2$—.

6. A compound according to the formula in claim 1, wherein R and $R^2$ are hydrogen, $R^3$ is hydrogen, methyl or acetylamino and Y is —CH$_2$CH$_2$—.
7. A compound according to the formula in claim 1, wherein $R^1$ is $C_1$- to $C_4$-alkyl, β-cyanoethyl, β-methoxy- or β-ethoxyethyl or phenylethyl.
8. The compound according to claim 1 of the formula
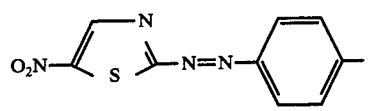
9. The compound according to claim 1 of the formula
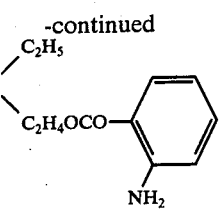
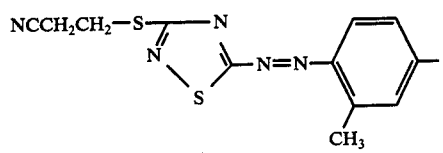
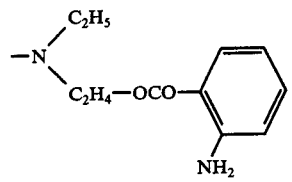
* * * * *